United States Patent
Zaki et al.

(10) Patent No.: US 7,592,284 B2
(45) Date of Patent: Sep. 22, 2009

(54) PREPARATION OF ION EXCHANGED POLYMER BOUND NITROGEN ADSORBENT

(75) Inventors: Rehan Zaki, Naperville, IL (US); Russ Johnson, Elmhurst, IL (US)

(73) Assignee: Honeywell International Inc., Morristown, NJ (US)

( * ) Notice: Subject to any disclaimer, the term of this patent is extended or adjusted under 35 U.S.C. 154(b) by 479 days.

(21) Appl. No.: 11/375,415

(22) Filed: Mar. 13, 2006

(65) Prior Publication Data

US 2007/0209509 A1 Sep. 13, 2007

(51) Int. Cl.
*B01D 53/02* (2006.01)

(52) U.S. Cl. .................. 502/60; 423/179.5; 423/181; 502/62; 502/75; 502/79; 95/902; 95/130; 210/660; 210/502.1; 96/108

(58) Field of Classification Search .............. 423/179.5, 423/181; 95/139.902; 96/108; 210/660, 210/502.1; 502/60, 62, 75, 79
See application file for complete search history.

(56) References Cited

U.S. PATENT DOCUMENTS

| | | | |
|---|---|---|---|
| 3,140,933 A | 7/1964 | McKee | |
| 3,574,539 A | 4/1971 | Domine et al. | |
| 4,375,458 A * | 3/1983 | Dwyer et al. | 423/705 |
| 4,663,052 A * | 5/1987 | Sherman et al. | 210/679 |
| 4,687,573 A * | 8/1987 | Miller et al. | 210/143 |
| 4,859,217 A * | 8/1989 | Chao | 95/130 |
| 5,152,813 A * | 10/1992 | Coe et al. | 95/103 |
| 5,174,979 A | 12/1992 | Coe et al. | |
| 5,203,887 A * | 4/1993 | Toussaint | 96/130 |
| 5,258,058 A | 11/1993 | Coe et al. | |
| 5,268,023 A | 12/1993 | Kirner | |
| 5,464,467 A * | 11/1995 | Fitch et al. | 95/98 |
| 5,616,170 A * | 4/1997 | Ojo et al. | 95/101 |
| 5,827,406 A * | 10/1998 | Frei et al. | 204/157.15 |
| 5,868,818 A * | 2/1999 | Ogawa et al. | 95/96 |
| 5,916,836 A * | 6/1999 | Toufar et al. | 502/86 |
| 5,922,107 A * | 7/1999 | Labasque et al. | 95/96 |
| 6,028,232 A * | 2/2000 | Park et al. | 570/210 |
| 6,423,121 B1 | 7/2002 | Kiyama et al. | |
| 6,425,940 B1 | 7/2002 | Chao et al. | |

(Continued)

FOREIGN PATENT DOCUMENTS

EP 0 758 561 A1 2/1997

OTHER PUBLICATIONS

European Search Report dated Aug. 31, 2007.

*Primary Examiner*—Duane Smith
*Assistant Examiner*—Christopher P Jones
(74) *Attorney, Agent, or Firm*—Oral Caglar, Esq.

(57) ABSTRACT

A high capacity adsorbent may be used for enriching oxygen concentration in an air stream. Such a high capacity adsorbent may be from about 2 to about 3 times lighter relative to the currently available technology. Furthermore, the high capacity adsorbent is readily capable of regeneration after deactivation by water vapor. Unlike current available immobilization technology in which clay binder was used to bind 13X zeolite and additional 10% organic binder was used to immobilize beads, the adsorbents of the present invention may be made using just an organic binder, thereby reducing pore spoilage caused by the clay binder. Further unlike conventional adsorbents, which may use sodium as its cation, the adsorbent of the present invention uses a lithium cation, thereby resulting in enhanced nitrogen adsorption performance.

9 Claims, 3 Drawing Sheets

U.S. PATENT DOCUMENTS

| | | | |
|---|---|---|---|
| 6,461,412 B1 * | 10/2002 | Jale et al. | 95/130 |
| 6,596,256 B1 * | 7/2003 | Ojo et al. | 423/700 |
| 6,652,626 B1 * | 11/2003 | Plee | 95/96 |
| 6,780,806 B1 * | 8/2004 | Yang et al. | 502/79 |
| 6,806,219 B2 * | 10/2004 | Masini et al. | 502/79 |
| 6,913,638 B2 * | 7/2005 | Sumida et al. | 95/98 |
| 7,319,082 B2 * | 1/2008 | Jasra et al. | 502/73 |
| 2001/0021368 A1 * | 9/2001 | Masini et al. | 423/700 |
| 2002/0014159 A1 | 2/2002 | Tatsumi et al. | |
| 2002/0114958 A1 * | 8/2002 | Ozeki et al. | 428/446 |
| 2002/0170436 A1 * | 11/2002 | Keefer et al. | 96/121 |
| 2004/0248727 A1 * | 12/2004 | Straub et al. | 502/79 |
| 2005/0137443 A1 * | 6/2005 | Gorawara et al. | 585/823 |

* cited by examiner

PREPARATION OF ION EXCHANGED POLYMER BOUND NITROGEN ADSORBENT

BACKGROUND OF THE INVENTION

The present invention generally relates to a high performance oxygen separation material and methods for making the same and, more specifically, to a polymer bound nitrogen adsorbent system for the production of oxygen by adsorbing nitrogen from air.

Gas separation is important to support a variety of commercial, industrial and medical needs. An adsorbent is used in on-board oxygen generation system (OBOGS) applications to remove nitrogen from the air, thereby enriching oxygen concentration in the outlet stream. The nitrogen separated from the air stream is then removed from the system using a higher temperature (temperature-swing adsorption) or a lower pressure (pressure-swing adsorption).

In addition to the use of this type of system on high performance military airplanes, adsorbent-based OBOGS offers a very large improvement for commercial transport systems by replacing the current stored oxygen systems. Pressurized or chemically-bound oxygen storage systems require on-board consumables and therefore have very limited capacity. An adsorbent-based oxygen source enables longer high-altitude emergency operations, thereby extending emergency operational range.

In any aerospace application, component size and weight are crucial factors that determine the success of the technology. Therefore, any system that may be reduced in size or weight, especially in aerospace applications, is a significant achievement.

Referring FIG. 1, there is shown a conventional method 100 for producing an immobilized OBOGS adsorbent. Materials, such as zeolite 13X, which have preferential affinities for nitrogen relative to oxygen are used to remove nitrogen and thereby concentrate oxygen. Generally, these materials are produced as small crystallites 102, which are bound with clay to form 1 mm beads 104 as shown in the step indicated by arrow 106. The clay binder reduces the available zeolite capacity by dilution and may also further reduce gas access to the zeolite by fouling zeolite pores. The beads 104 may be immobilized with an organic binder and activated by conventional methods (such as thermal treatment) as shown at arrow 108 to form an immobilized OBOGS adsorbent 110. The organic binder currently in use has a tg (glassy temperature) in the range of 210° C. which is not high enough temperature for complete activation; at least 340° C. is required for complete water removal.

As can be seen, there is a need for a method for making an oxygen separation material that provides higher zeolite concentration by using less binder, thereby reducing the weight necessary to devote to the oxygen separation material. There is also a need to produce this material in a matrix that is stable to a temperature of at least 340° C.

SUMMARY OF THE INVENTION

In one aspect of the present invention, a method for ion exchange in an adsorbent, the method comprises calcining the adsorbent by thermal treatment to yield a calcined adsorbent; treating the calcined adsorbent with a lithium salt to yield a treated adsorbent; washing the treated adsorbent with an aqueous base to yield a washed adsorbent; air drying the washed adsorbent to yield an air-dried adsorbent; drying the air-dried adsorbent in a vacuum to yield a vacuum-dried adsorbent; and flowing preheated nitrogen through the adsorbent.

In another aspect of the present invention, a method for increasing the oxygen concentration of an air stream, the method comprises preparing an adsorbent by ion exchanging sodium ions in the adsorbent with lithium ions to form an ion-exchanged adsorbent; drying the ion-exchanged adsorbent in a vacuum to form a vacuum-dried adsorbent; further drying the vacuum-dried adsorbent by flowing a preheated stream of nitrogen therethrough; packing the adsorbent into a bed at the appropriate density; and passing the air stream through the bed to yield a resulting air stream having an enhanced oxygen concentration.

In yet another aspect of the present invention, a method for making a polymer bound nitrogen adsorbent, the method comprises binding particles of inorganic adsorbent with an organic polymer to form a bound adsorbent; forming the bound adsorbent into an extrudate; ion-exchanging sodium ions in the extrudate with lithium ions to give an ion-exchanged adsorbent; packing the ion-exchanged adsorbent at the appropriate density to give a packed adsorbent; and activating the packed adsorbent.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a high capacity adsorbent for enriching oxygen concentration in an air stream, and method for producing the same, which may be from about 2 to about 3 times lighter relative to the currently available technology. Furthermore, the present invention provides a high capacity adsorbent for enriching oxygen concentration that may be capable of regeneration after deactivation by water vapor. Unlike conventional adsorbents, which use a clay binder, the adsorbents of the present invention may be made using an organic binder, thereby reducing pore spoilage caused by the clay binder. Further unlike conventional adsorbents, which may use sodium as its cation, the adsorbent of the present invention uses a lithium cation, thereby resulting in enhanced performance.

The adsorbents of the present invention may be useful in any situation where oxygen may be necessary or where an enhanced air flow, containing an oxygen concentration above its normal concentration, is necessary. The adsorbent of the present invention may be especially useful in military and commercial aircraft.

Figure 1:
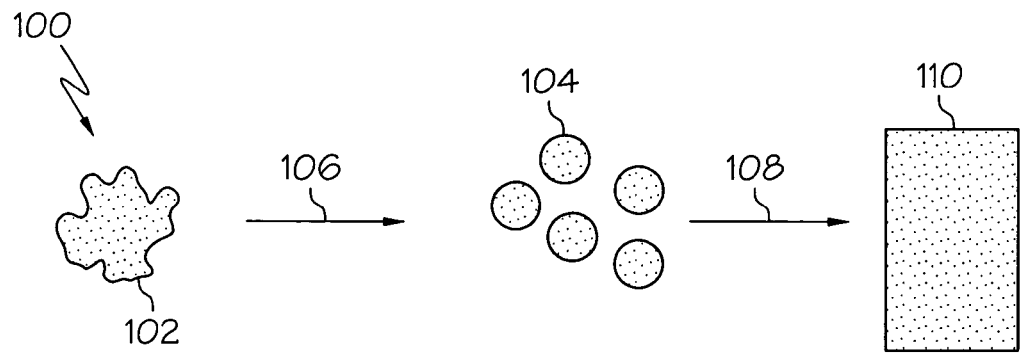
FIG. 1 shows a conventional method for producing an immobilized OBOGS adsorbent.
Figure 2:
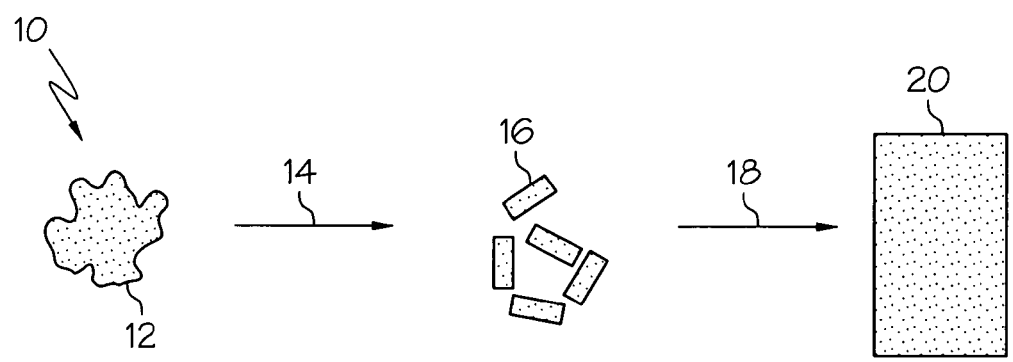
FIG. 2 shows a method for producing an immobilized OBOGS adsorbent according to one embodiment of the present invention.

Referring to FIG. 2, there is shown a method 10 for producing an immobilized adsorbent 20 according to one embodiment of the present invention. Particles 12 of inorganic adsorbent may be bound using an organic polymer that is stable at high temperature. The inorganic adsorbent may be chosen based on its ability to adsorb a selected element, such as nitrogen, from a gas mixture. In the case of adsorbing nitrogen, the inorganic adsorbent can include zeolite, activated alumina, silica gel, carbon molecular sieves and mixtures thereof. While various zeolites can be useful, zeolite 13X may be used due to its capability for selectively adsorbing nitrogen from air. The term "zeolite 13X" generally refers to zeolite 13X(HP-13X, 13-HP) which is described in UOP Material Safety Data Sheet dated February 1997, published by UOP Inc. as sodium aluminosilicate molecular sieve type 13 hp having less than 60% silicon oxide, less than 40% aluminum oxide, less than 20% sodium oxide, and less than 5% magnesium oxide. As an example, zeolite 13X is manufactured by UOP Inc. under the trade name OXYSIV® 5(Oxy-5).

The resulting mixture of zeolite particles 12 and organic polymer may be formed into an extrudate 16 as shown by step 1 at arrow 14. The specific organic polymer used can vary. Examples of useful polymers include polysulfone, polyamide, polyimide, epoxy, polyolefin, polyether, polysiloxane, polyvinyl and polyketone. For example, polyimide may be an organic polymer that results in good mechanical strength over the required temperature range. Optionally, the organic polymer may be combined with a crosslinking or hardening agent that may be activated on heating, while in other cases, no such crosslinking agent is necessary. Where used, the crosslinking agent may be chosen with the choice of polymer in mind, since it is well known to those skilled in the art that certain crosslinkers are used with certain polymers. Thus, for example, various polyfunctional organic amines are frequently used to crosslink epoxy polymers, and diols or polyols are used to crosslink polymeric siloxanes. Methods for making conventional adsorbents may be found in co-owned U.S. Pat. Nos. 6,585,810 and 6,451,723, herein incorporated by reference.

The extrudate 16 may be ion exchanged to a lithium form as shown in step 2 at arrow 18 of FIG. 2. This process is described in more detail below with reference to FIG. 4. Once the ion exchange is complete, the Li-exchanged extrudate (not shown) may be pressed to a specific packing density for the particular application. For example, in an OBOGS application, the packing density may be from about 0.50 to about 0.65 g/mL. Finally, the bed may be activated by thermal treatment between about 300 to about 400° C. to yield the immobilized adsorbent 20. In particular, about 350° C. may be an adequate thermal activation temperature.

The use of the organic polymer in the above described method to bind and immobilize the 13X zeolite crystals may provide higher nitrogen adsorption capacity relative to clay beads. Organic binder may enable the use of a higher concentration of zeolite relative to clay-bound beds because less organic binder is needed to bind the crystallites. By using this approach, the capacity of the adsorbent may be improved by about 28% due to the availability of more adsorptive sites available for nitrogen to adsorb.

Figure 3:
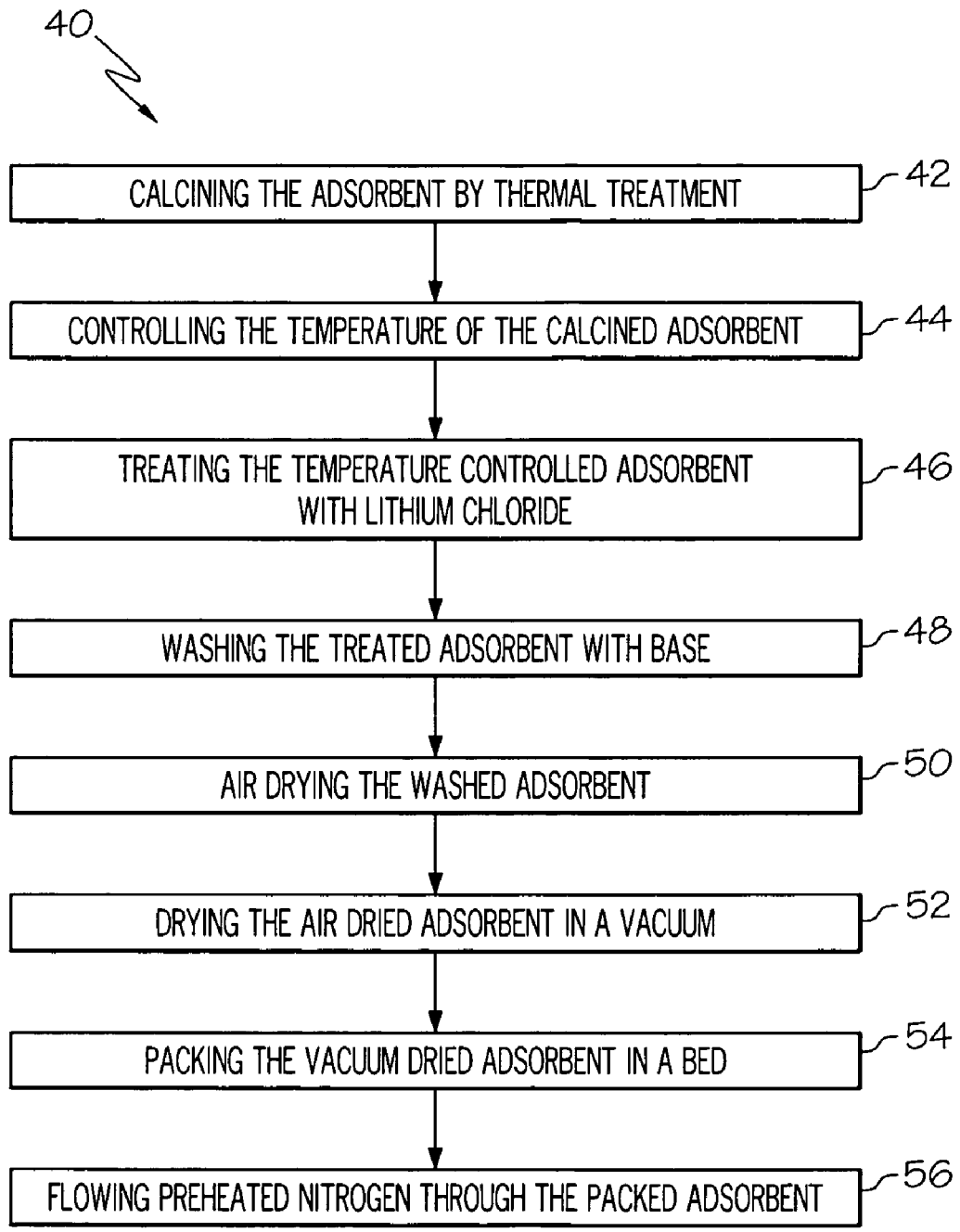
FIG. 3 shows a flow chart depicting a method for the lithium-ion exchange of zeolite according to an embodiment of the present invention.

Referring now to FIG. 3, there is shown a flow chart depicting a method 40 for the lithium-ion exchange of zeolite. In a first step 42, the polymer bound nitrogen adsorbent (for example, the extrudate 16 of FIG. 2) may be calcined by thermal treatment at a temperature from about 150 to about 400° C. In one embodiment of the present invention, the calcining of the adsorbent may be done at 250° C. for about 24 hours. In step 44, the calcined adsorbent may be controlled at a temperature between about 50 to about 100° C. In one embodiment of the present invention, the temperature may be controlled at about 80° C. after loading the calcined adsorbent into a glass jacketed column with water circulating through the jacket. In step 46, the temperature controlled calcined adsorbent may be treated with a lithium salt solution having a concentration from about 0.5 to about 5M. In one embodiment of the present invention, the temperature controlled calcined adsorbent may be treated with 1M to 3M lithium chloride. This step 46 may be continued for a sufficient time to increase the solid-phase concentration of lithium cation to a level of three to four times the solid-phase concentration of sodium cation present in the adsorbent. The cation measurement may be made by techniques known to one skilled in the polymer arts.

Once the appropriate lithium ion concentration is reached, the adsorbent may be washed at step 48 with basic deionized water at pH 9 ($NaOH_{(aq)}$) until non-adsorbed (non-cation exchanged) lithium residue is washed away completely. At step 50, the washed ion-exchanged adsorbent may be air dried from about 15 minutes to about 10 hours. In one embodiment of the present invention, the ion-exchanged adsorbent may be air dried for about 2 hours.

At step 52, the air dried adsorbent may be dried in a vacuum (1-5 torr) oven at between 50 and 200° C. from about 15 minutes to about 48 hours. In one embodiment of the present invention, the air dried adsorbent may be dried in a vacuum oven at about 110° C. for about 20 hours. About 50% of the water may be removed at 110° C. under vacuum, yield a partially activated adsorbent. Increasing the temperature at or above 300° C. may soften the polymer and may collapse pores as water exits, thus decreasing the nitrogen adsorbent efficiency.

At step 54, the partially activated adsorbent may be packed into a bed at the appropriate density (in an OBOGS application, for example, the packing density may be from about 0.50 to about 0.65 g/mL). Finally at step 56, preheated nitrogen may be flowed through the bed with a high linear velocity. For example, the preheated nitrogen may flow through the bed at a linear velocity from about 60 to about 90 feet/minute. In one embodiment of the present invention, the preheated nitrogen has a temperature of about 300° C. In an alternate embodiment of the present invention, the preheated nitrogen may be ramped from about the same temperature used in the vacuum oven of step 52, to about 300° C. over a period of about 15 minutes to about 4 hours. The preheated nitrogen may flow through the bed for about 20 hours, or at least until all of the water is removed from the bed.

Figure 4:
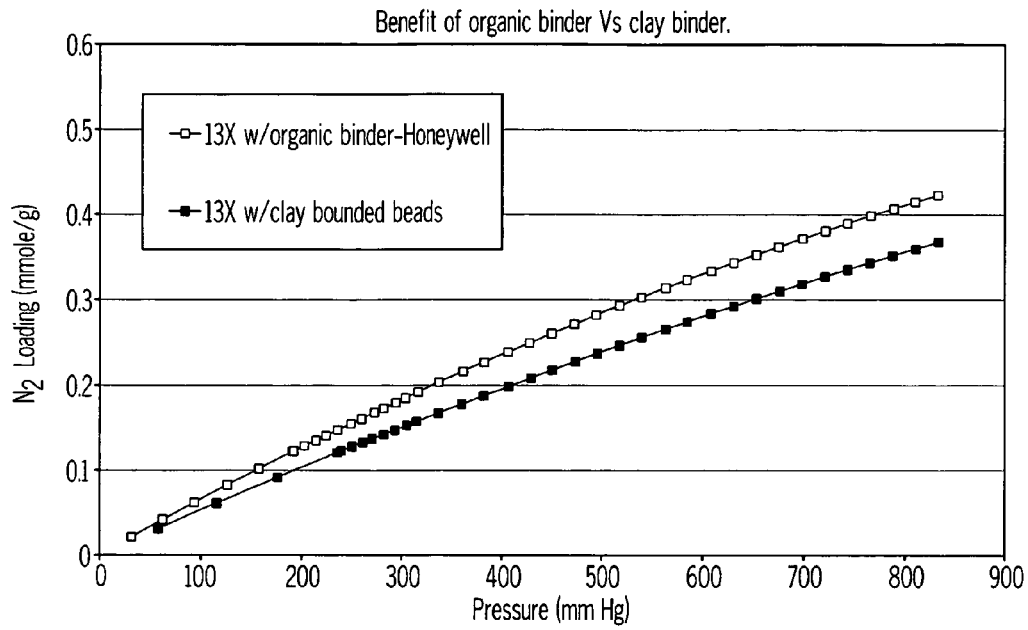
FIG. 4 shows a graph depicting particular efficiencies of an immobilized OBOGS adsorbent according to one embodiment of the present invention.

Referring to FIG. 4, there is shown a graph depicting particular efficiencies of an immobilized OBOGS adsorbent of the present invention versus a conventional adsorbent using a clay binder. Throughout all pressure ranges, the graph clearly shows that the system of the present invention, using an organic binder, has superior nitrogen loading as compared to conventional adsorbents made with a clay binder. Furthermore, referring to FIG. 5, there is shown a graph depicting particular efficiencies of an immobilized OBOGS adsorbent of the present invention versus a conventional adsorbent using a sodium form of the zeolite as the adsorbent. As in the previous graph, this graph shows, throughout all pressure ranges, that the system of the present invention has superior nitrogen loading efficiency when compared to a conventional adsorbent using sodium-ion zeolite. The adsorbent used for this chart was made according to the methods of the present invention, as described above, resulting in about 99% Li exchange.

Figure 5:
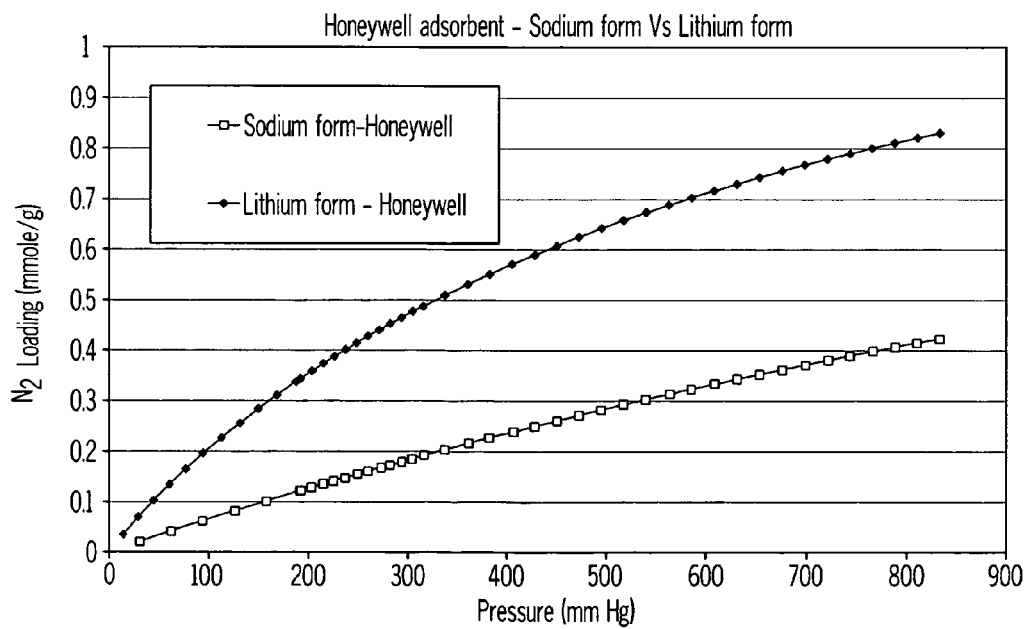
FIG. 5 shows a graph depicting particular efficiencies of an immobilized OBOGS adsorbent according to one embodiment of the present invention.

When the efficiencies shown in FIGS. 4 and 5 are combined into a single adsorbent (that is, an adsorbent using an organic binder and the lithium form of zeolite), the resulting adsorbent is far superior to conventional adsorbents. This may result in an increased nitrogen capacity by a factor of about three compared to the conventional technologies.

It should be understood, of course, that the foregoing relates to exemplary embodiments of the invention and that modifications may be made without departing from the spirit and scope of the invention as set forth in the following claims.

We claim:

1. A method for making an ion exchange adsorbent, the method comprising:
   binding the adsorbent with an organic polymer to form a bound adsorbent;
   calcining the bound adsorbent by thermal treatment at a temperature in the range of 150° C. to 400° C. to yield a calcined adsorbent;
   treating the calcined adsorbent with a lithium salt to yield a treated adsorbent;
   washing the treated adsorbent with an aqueous base to yield a washed adsorbent;
   air drying the washed adsorbent to yield an air-dried adsorbent;
   drying the air-dried adsorbent in a vacuum to yield a vacuum-dried adsorbent;
   flowing preheated nitrogen through the vacuum-dried adsorbent, the temperature of the preheated nitrogen being about 300° C.; and
   immobilizing the adsorbent.

2. The method according to claim 1, further comprising packing the vacuum-dried adsorbent into a bed prior to flowing preheated nitrogen therethrough.

3. The method according to claim 1, wherein the adsorbent is zeolite 13X.

4. The method according to claim 1, wherein the temperature of the calcined adsorbent is controlled between about 50 to about 100° C.

5. The method according to claim 1, wherein the lithium salt is lithium chloride at a concentration from about 0.5 to about 5M.

6. The method according to claim 1, wherein the treated adsorbent is washed with aqueous sodium hydroxide having a pH of about 9.

7. The method according to claim 1, wherein the air-dried adsorbent is vacuum-dried at a temperature from about 50 to about 200° C. for a period from about 15 minutes to about 10 hours.

8. A method for making an ion exchange adsorbent, the method comprising:
   binding the adsorbent with a binder comprising an organic polymer and a cross-linked agent to form a bound adsorbent, the binder having a selected glassy temperature;
   calcining the bound adsorbent by thermal treatment, at a temperature in the range of 150° C., to 400° C., to yield a calcined adsorbent;
   treating the calcined adsorbent with a lithium salt to yield a treated adsorbent;
   washing the treated adsorbent with an aqueous base to yield a washed adsorbent;
   air drying the washed adsorbent to yield an air-dried adsorbent;
   drying the air-dried adsorbent in a vacuum to yield a vacuum-dried adsorbent; and
   flowing preheated nitrogen through the vacuum-dried adsorbent, the preheated nitrogen having a temperature of about 300° C.

9. A method for making an ion exchange adsorbent, the method comprising:
   binding the adsorbent with a binder comprising an organic polymer and a cross-linked agent to form a bound adsorbent;
   calcining the bound adsorbent by thermal treatment to yield a calcined adsorbent;
   treating the calcined adsorbent with a lithium salt to yield a treated adsorbent;
   washing the treated adsorbent with an aqueous base to yield a washed adsorbent;
   air drying the washed adsorbent to yield an air-dried adsorbent;
   drying the air-dried adsorbent in a vacuum to yield a vacuum-dried adsorbent; and
   flowing preheated nitrogen through the vacuum-dried adsorbent, the preheated nitrogen having a temperature of about 300° C.;
   wherein the adsorbent is zeolite 13X; and
   wherein the lithium salt is lithium chloride.

* * * * *

UNITED STATES PATENT AND TRADEMARK OFFICE
CERTIFICATE OF CORRECTION

PATENT NO. : 7,592,284 B2  Page 1 of 1
APPLICATION NO. : 11/375415
DATED : September 22, 2009
INVENTOR(S) : Zaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 672 days.

Signed and Sealed this

Twenty-first Day of September, 2010

David J. Kappos
*Director of the United States Patent and Trademark Office*